United States Patent
Longbottom

[15] 3,645,128
[45] Feb. 29, 1972

[54] CONTAINERS FOR PRESSURIZED GAS

[72] Inventor: Geoffrey Brian Longbottom, Redditch, England

[73] Assignee: The Hymatic Engineering Company Limited, Redditch, England

[22] Filed: Mar. 25, 1970

[21] Appl. No.: 22,457

[30] Foreign Application Priority Data

Mar. 26, 1969 Great Britain......................15,790/69

[52] U.S. Cl..............................................73/49.3, 73/406
[51] Int. Cl........................................................G01m 3/34
[58] Field of Search..................73/388, 49.3, 406, 420, 395; 210/89 A, 39 C, 47; 280/150 AB

[56] References Cited

UNITED STATES PATENTS 1,974,026  9/1934  Hicks......................................73/49.3
3,350,931  11/1967  Johnson et al..........................73/152

Primary Examiner—Donald O. Woodiel
Attorney—Watson, Cole, Grindle & Watson

[57] ABSTRACT

A container pressurized gas capable of retaining the pressurized gas for long periods. A diaphragm is sealed in a socket in an opening in the container. A plug received by the socket has means for admitting gas at a known pressure to the diaphragm, and a probe connected in circuit with a battery and lamp to detect whether the diaphragm moves away from its under such pressure.

The container also has a charging opening closed by an interference fit plug in a narrow passage and a screw-threaded plug soldered in place.

It also has a discharge opening sealed by a diaphragm in a socket which communicates with the load and can receive an explosive igniter to pierce the diaphragm, or a connection to an auxiliary supply of gas to test the load.

6 Claims, 4 Drawing Figures

PATENTED FEB 29 1972
3,645,128
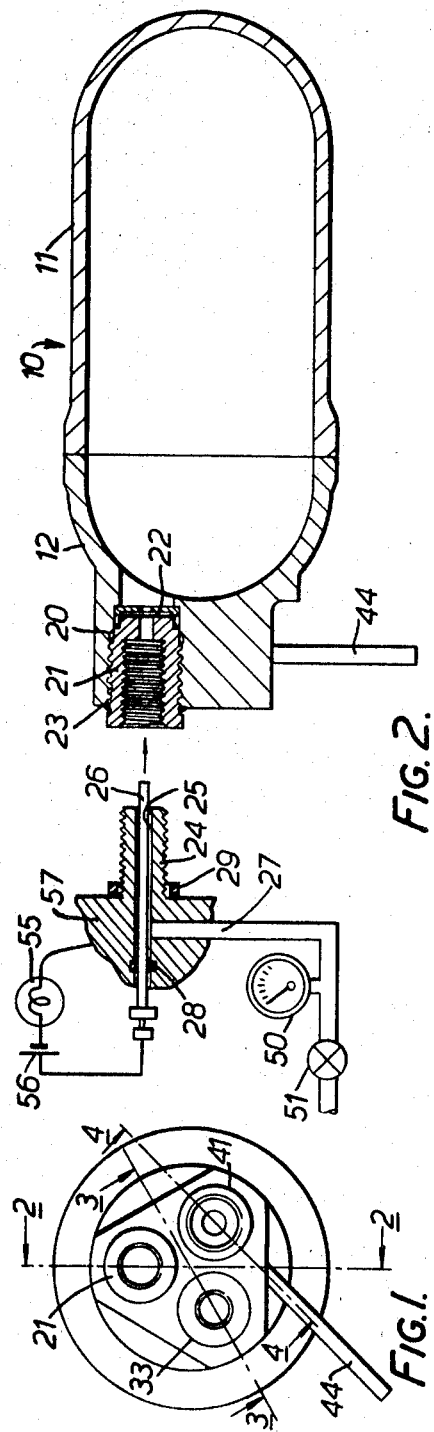
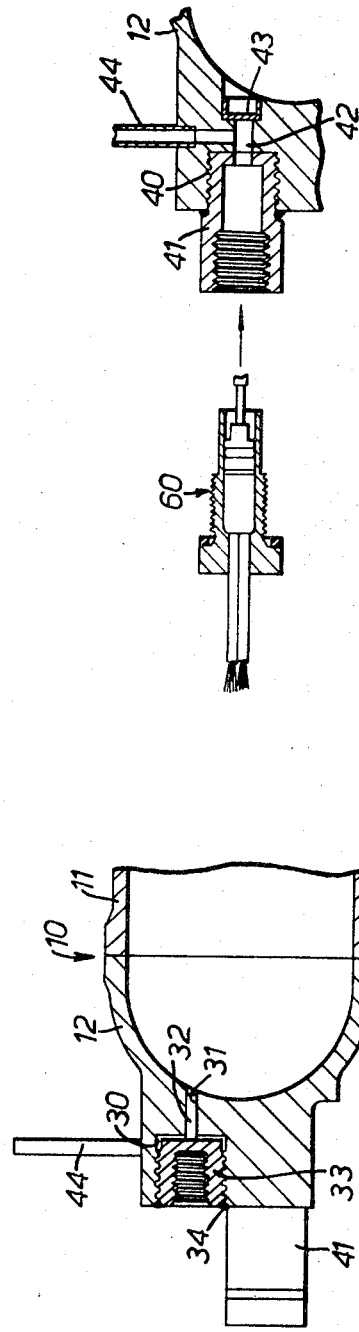
INVENTOR
GEOFFREY B. LONGBOTTOM
BY
Watson, Cole, Grindle & Watson
ATTORNEY

CONTAINERS FOR PRESSURIZED GAS

This invention relates to containers for pressurized gas and one aspect of the invention is concerned with apparatus for testing or measuring the pressure in a container of pressurized gas.

According to the present invention a container for pressurized gas has means for testing or measuring the pressure in it which comprises a diaphragm sealed in an opening in the container, a probe cooperating with the external face of the diaphragm to detect movement towards the interior of the container, and means for applying to the said outer face a fluid pressure of known value.

For checking whether or not the gas pressure is up to a desired value it may suffice to apply a predetermined pressure to the outer face of the diaphragm and note whether or not movement occurs. Alternatively to measure the gas pressure the external pressure may be increased progressively until the said movement occurs.

The diaphragm may be permanently sealed in the container and the probe and fluid pressure-applying means may be arranged to be detachably connected to the opening in the container when required. The apparatus may include an electric circuit through the diaphragm and the probe, the latter making electrical contact with the diaphragm until the diaphragm recedes from it thereby breaking the circuit.

The invention may be applied to pressure gas bottles intended to contain a supply of gas under pressure for operating cryogenic coolers of the Joule Thomson type. Such bottles may be kept in storage for long periods, possibly years, and it is important to be able to determine whether the bottle is still charged when taken out of storage for use. For this purpose in accordance with the present invention a screw-threaded socket opening in the wall of the container may be provided with a screw-threaded bush the end of which carries soldered to it a flexible metal diaphragm. The bush may be soldered to the edge of the socket in addition to being screwed so as to provide a hermetic seal preventing any leakage even over periods of years.

The bottle may also be provided with an outlet pipe connection which may be sealed by means of a pierceable diaphragm welded or soldered in an opening in the container. For the purpose of piercing the diaphragm the opening may be provided with a threaded socket to receive an explosive igniter or other means of puncturing the disc.

In general the socket for the igniter will be coaxial with the disc and the passage connecting them will communicate with a lateral pipe connection leading to the cooling apparatus or other equipment to be supplied with gas. In this case an auxiliary supply of gas may be connected to the coupling in place of the explosive igniter and will then communicate with the load, such as the cooler, so that the latter may be tested without effecting the integrity of the seal of the bottle itself.

For charging and sealing the container a screw-threaded charging opening may be provided which communicates with the interior of the container through a narrow passage. The bottle is filled through the screw-threaded connection and a plug is then driven as an interference fit into the narrow passage while still under pressure. This serves to retain the pressure while the pressure connection is removed and a screw-threaded retaining plug is then screwed into the opening and its margin soldered in position in order to provide a permanent leaktight joint.

The invention may be put into practice in various ways but one specific embodiment will be described by way of example with reference to the accompanying drawings in which:

FIG. 1 is an end view of a high-pressure gas bottle;

FIG. 2 is a sectional elevation of the bottle on the line 2—2 of FIG. 1 showing the socket for the pressure testing device;

FIG. 3 is a partial section on the line 3—3 of FIG. 1 showing the charging socket; and FIG. 4 is a partial section on the line 4—4 of FIG. 1 showing the discharging socket.

In the embodiment shown the invention is applied to a small high-pressure gas bottle suitable for storing a gas such as nitrogen under pressure which may be stored under pressure for long periods, possibly years, and then used for example to supply a small cryogenic cooler working on the Joule Thomson principle.

The container 10 is conveniently formed in two portions, a body portion 11 and a head portion 12. These two portions may be friction welded together so as to avoid contamination of the contents with impurities, a point of considerable importance in connection with cryogenic cooling systems where impurities may freeze and block the apparatus.

As shown in FIGS. 2, 3 and 4 the head portion has formed in it three screw-threaded sockets 20, 30 and 40, respectively to receive a testing device, a charging coupling and a discharge coupling.

It is important to be able to determine whether the bottle is still charged when taken out of storage for use and for this purpose a testing device diagrammatically shown in FIG. 2 is provided.

The test socket 20 receives a screw-threaded bush 21 having soldered to its inner end a diaphragm 22. Thus one side of the diaphragm is exposed to the pressure inside the bottle while its other side is exposed to pressure inside the bush 21, the diaphragm being secured by its edge so that its middle portion can move away from the bush if the pressure inside the bush exceeds that in the bottle. After the bush has been threaded into the bottle its edge is soldered to the edge of the test socket as shown at 23 so as to provide a hermetic seal preventing any leakage even over periods of years.

The testing device comprises a screw threaded plug 24 which can be screw-threaded into the bush 21 and has in it a central bore 25 through which extends a metal probe 26 which is insulated from the body of the plug 24. The central bore communicates with a lateral pipe connection 27 which can be connected to a pressure gauge 50 and through a valve 51 to a source of pressure (not shown) such as a pump or bottle of gas. The axial bore 25 is provided with a seal 28 behind the lateral connection but the probe is a slack fit in its forward portion so that gas can flow into the bush 21. A seal 29 is provided between the plug 24 and the bush 21.

An electric testing circuit, comprising a lamp 55 and a battery 56, is connected between the probe 26 and the body 57 of the plug 24 which in turn is of course connected to the bottle 10 and the diaphragm 22.

In order to test the pressure within the bottle the plug 24 is threaded into the bush 21, the probe 26 is pressed in until the lamp is illuminated, indicating that it is in contact with the diaphragm 22, and the pressure is then gradually raised until the lamp 55 is again extinguished, indicating that the pressure on the external face of the diaphragm balances or exceeds that on the internal face so that the diaphragm has been pushed back out of contact with the probe. Accordingly the pressure indicated by the pressure gauge 50 represents the pressure inside the container at least approximately.

Accordingly the arrangement described provides a very simple and reasonably accurate method of measuring the pressure inside a container of pressurized gas without providing any outlet through which leakage could occur even over a period of years.

FIG. 3 shows an arrangement for charging and sealing the bottle. This comprises the screw-threaded charging socket 30 which communicates with the interior of the bottle 10 through a narrow passage 31. The bottle is filled through the screw-threaded socket and a plug 32 is then driven as an interference fit into the narrow passage while still under pressure. This serves to retain the pressure while the pressure connection is removed and a screw-threaded retaining plug 33 is then threaded into the opening and its margin soldered in position as at 34 in order to provide a permanent leaktight joint.

FIG. 4 shows the arrangement for discharge. The discharge socket 40 again receives a screw-threaded bush 41 the interior of which communicates with that of the bottle through a narrow passage 42. At the inner end of the passage 42 a pierceable diaphragm 43 is welded or soldered in the opening in the container. The passage 42 communicates with a lateral pipe connection 44 connected to the cooler (not shown) or other device to be supplied with gas. The bush 41 is screw-threaded to receive an explosive igniter 60 or other means (not shown) which closes the open end of the bush 41 and serves to puncture the diaphragm 43.

In order to test the cooler or other load an auxiliary supply of gas may be connected to the bush 41 in place of the explosive igniter 60 and will then communicate with the load and supply gas to it without affecting the integrity of the seal of the bottle itself and without the necessity to disconnect the piping connecting the bottle to the load.

Accordingly the invention provides an arrangement in which the bottle can be kept charged for long periods and can indeed be connected up to a load such as a cooler, and both the pressure in the bottle can be tested and the operation of the cooler can be tested without in any way interfering with the connections and without affecting the integrity of the seal of the bottle itself.

We claim:

1. A rigid container having a predetermined fluid pressure therein, an opening in said container, a bush provided for closing said opening, said bush presenting an inner flat surface facing the interior of said container, said bush also having a small substantially central bore opening extending through its inner flat surface, a flexible diaphragm having an inner surface exposed to the interior of said container and an outer surface normally resting against said bush inner surface, said diaphragm being hermetically sealed along the periphery of said bush, means for applying a fluid pressure at a predetermined reference value into said bore opening against said diaphragm outer surface, said diaphragm outer surface being out of contact with said bush inner surface when said reference pressure exceeds said container pressure, and a probe member operatively contacting said diaphragm outer surface only when said diaphragm remains in contact with said bush inner surface, whereby a leakage in the container pressure may be detected by said probe member as said diaphragm lies out of contact with said bush inner surface and further out of contact with said probe during a condition of a reduced container pressure as compared to reference pressure.

2. A container as claimed in claim 1 in which said probe and a fluid pressure-applying means are detachably connected to said container opening by means of a screw-threaded connection.

3. A container as claimed in claim 1 including electric circuit means for electrically interconnecting said diaphragm and said probe, said probe making electrical contact with said diaphragm when said diaphragm is in contact with said bush inner surface, said probe being out of contact with said diaphragm when it is out of contact with said bush inner surface, thereby serving to break the circuit.

4. A container as claimed in claim 1 in which said bush is provided with screw threads for threadedly closing said container opening, said diaphragm being of flexible metal and being soldered along said bush periphery.

5. A method of testing the pressure in a container of pressurized gas as claimed in claim 1 including, checking whether or not said container gas pressure is up to a desired value by applying said reference pressure to the outer face of said diaphragm which corresponds with said container pressure.

6. A method of testing the pressure in a container of pressurized gas as claimed in claim 1 including the step of progressively increasing said reference pressure beyond its predetermined amount until said diaphragm is made to lie out of contact with said bush inner surface.

* * * * *